Feb. 23, 1965     J. T. SHACKEL     3,170,709
UTILITY CARTS
Original Filed Aug. 16, 1956     3 Sheets-Sheet 1
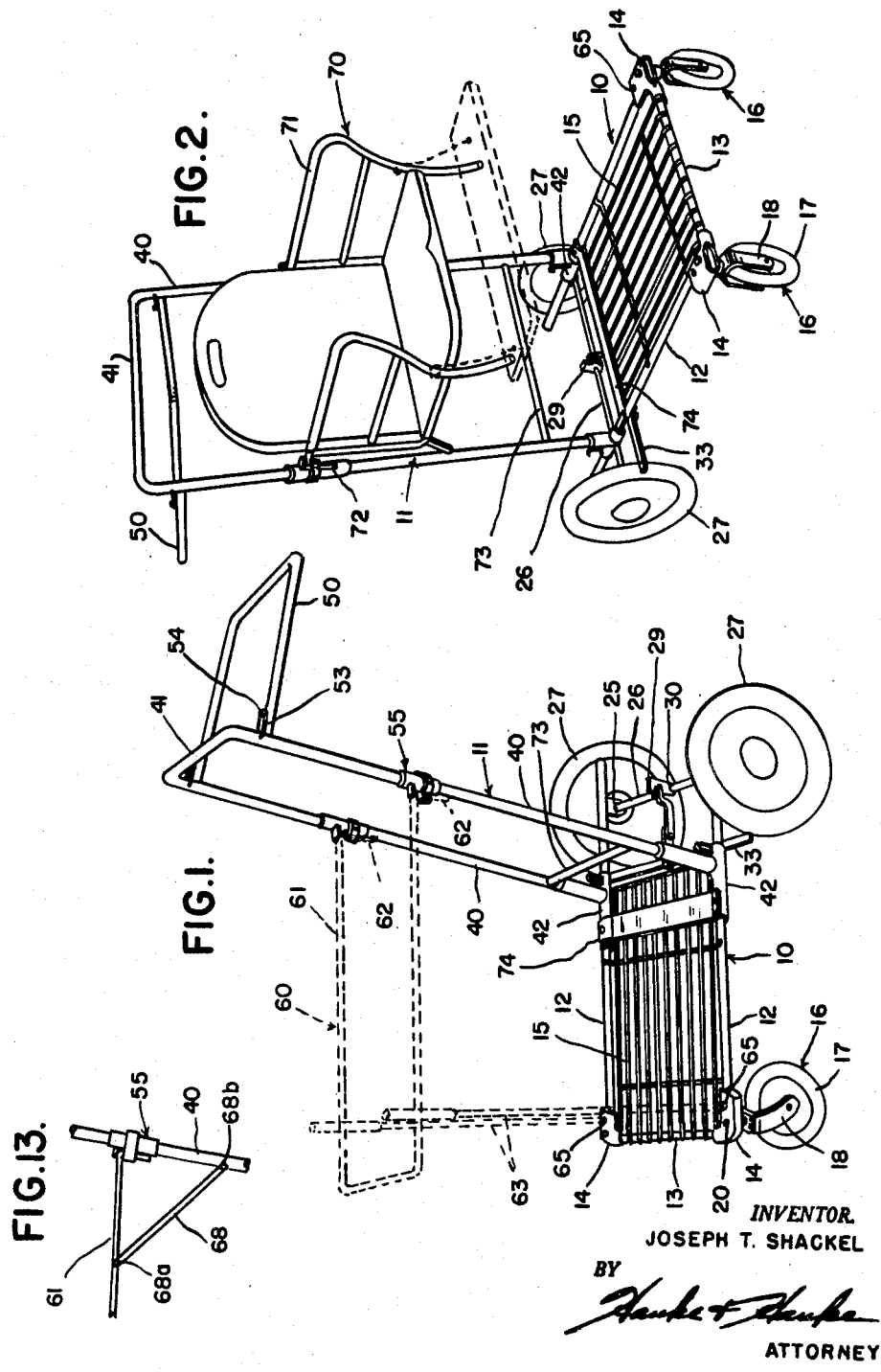
INVENTOR.
JOSEPH T. SHACKEL
BY
*Hauke & Hauke*
ATTORNEYS

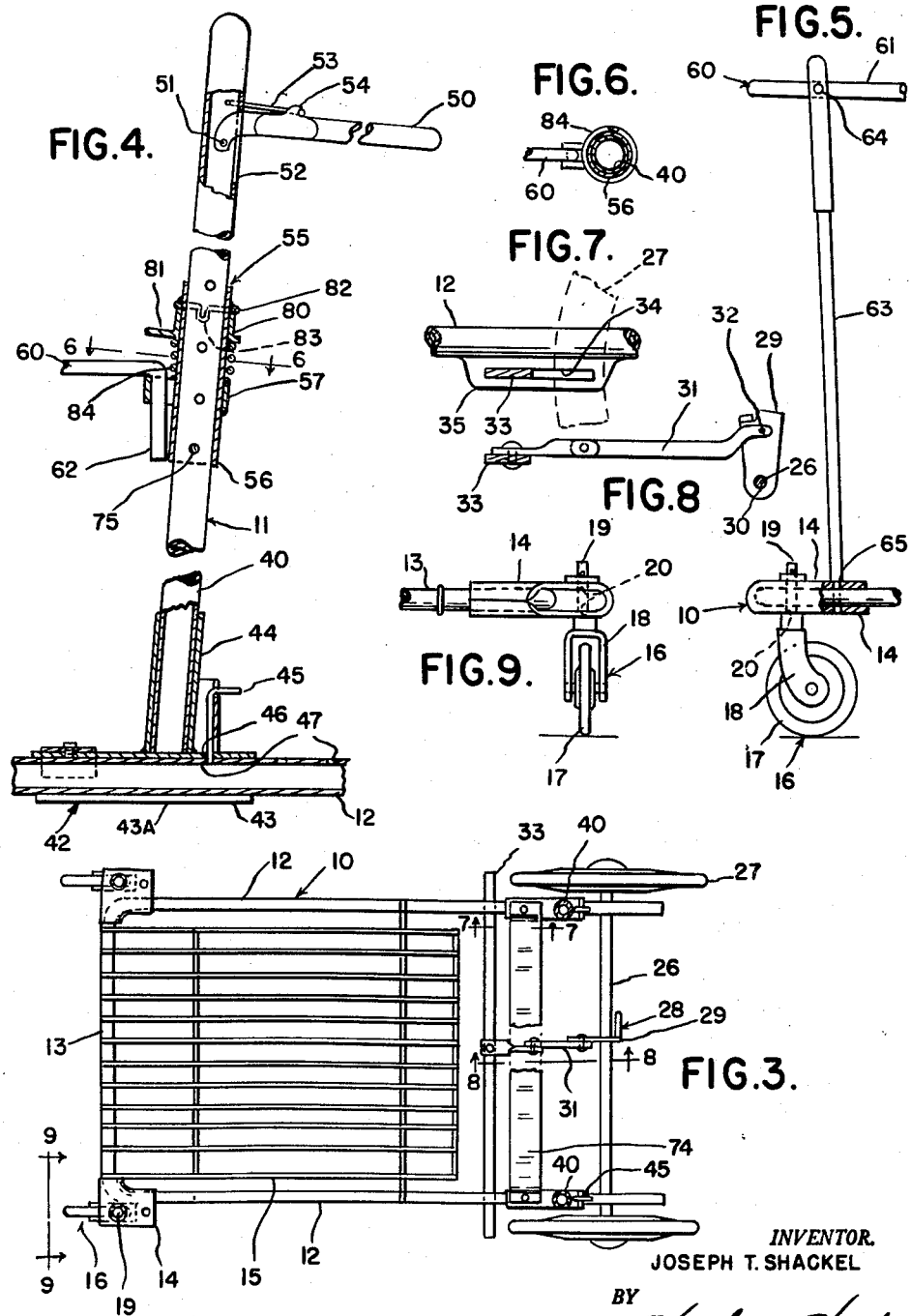

INVENTOR.
JOSEPH T. SHACKEL
BY
Hanke + Hanke
ATTORNEYS

United States Patent Office 3,170,709
Patented Feb. 23, 1965

3,170,709
UTILITY CARTS
Joseph T. Shackel, 14636 Bringard Drive, Detroit 5, Mich.
Original application Aug. 16, 1956, Ser. No. 604,353, now Patent No. 3,037,786, dated June 5, 1962. Divided and this application Mar. 19, 1962, Ser. No. 180,901
7 Claims. (Cl. 280—47.34)

The present application is a division of my copending application Serial No. 604,353, filed August 16, 1956, and since issued as Patent No. 3,037,786.

My invention relates to utility carts and more particularly to the type of cart which may be converted for multiple purposes.

Such utility carts heretofore available suffer from certain drawbacks such as being restricted in use to certain limited functions, lacking proper stability and balance during some of its uses, and being somewhat complicated in construction and causing difficulty in changing from one use to another.

An object of my invention is to construct an improved multiple function utility cart by providing a simplified structure having readily adjustable units which may be so placed as to provide proper balance and stability during all possible uses.

Another object of my invention is to provide an improved multiple-use utility cart by constructing component parts which may be readily connected and adjusted to various uses.

A further object of my invention is to improve utility cart construction by providing a cart comprising basic readily adjustable support structures adaptable for supporting a widely varied combination of accessories.

For a more complete understanding of my invention, reference may be had to the accompanying drawings illustrating preferred embodiments of the invention in which like characters refer to like parts throughout the several views and in which FIG. 1 is a perspective view of the utility cart embodying my invention.

FIG. 2 is a different perspective view illustrating one of the varied uses to which the cart may be put.

FIG. 3 is a plan view of the bare frame component assembly of the cart shown in FIGS. 1 and 2.

FIG. 4 is a fragmentary side elevational view, partially in section, of another component assembly of the cart shown in FIGS. 1 and 2.

FIG. 5 is a fragmentary side elevational view, partially in section, of a component assembly of the cart shown in FIG. 1.

FIG. 6 is a cross-sectional detail taken substantially on the line 6—6 of FIG. 4.

FIG. 7 is a cross-sectional detail taken substantially on the line 7—7 of FIG. 3.

FIG. 8 is a cross-sectional detail taken substantially on the line 8—8 of FIG. 3.

FIG. 9 is a fragmentary view as seen substantially from the line 9—9 of FIG. 3.

FIG. 13 is a fragmentary view of an alternative accessory supporting structure.

Figure 10:
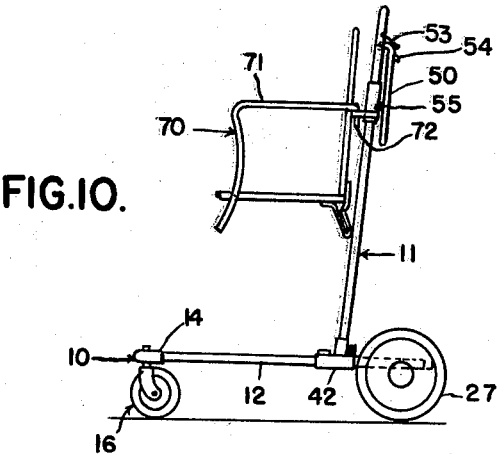
FIG. 10 is a side elevational view illustrating one position of the utility cart utilizing one type of accessory as shown in FIG. 2.

The basic utility cart illustrated in FIG. 1 comprises a base frame structure 10 and an upright carrier structure 11. The base frame structure 10 comprises a pair of spaced longitudinally extending, preferably tubular side bars 12 and a transverse forward bar 13 connecting the side bars 12 preferably by means of carrier fixtures 14. The bars 12 and 13 form a framework to which a grid-like platform 15 is secured.

The corner fixtures 14 are each provided with a conventional pivoted trailing traction wheel assembly 16 having a wheel 17 rotatably supported in a yoke 18 provided with a shaft 19 which extends through a pivot hole 20 in the fixture 14, as shown in more detail in FIGS. 5 and 9. It will be noted that non-pivoted wheels may also be used.

Near the rear ends of the side bars 12 are secured suitable fittings 25 for supporting a rear axle 26 provided with traction wheels 27. A wheel braking and locking mechanism 28 is illustrated in FIGS. 3, 7 and 8, as is conventionally used on equipment such as baby carriages, comprising a pedal 29 pivotally supported as at 30 on the axle 26 and a two-part lever 31 pivotally secured as at 32 thereto. A flat braking bar 33 is secured to the lever 31 at the end opposite the pivot point 32 and is slidably carried in slots 34 of fittings 35 secured to the side bars 12. When the pedal 29 is depressed, the lever 31 is pulled rearward, drawing the bar 33 against the wheels 27.

The upright carrier structure 11 comprises a pair of spaced generally vertical, preferably tubular side bars 40 and an upper connecting cross bar 41. A pair of generally T-shaped fixtures 42 adjustably connects the carrier structure 11 with the base frame structure 10. The fixtures 42 each comprise a horizontal tubular member 43 slidably carried by the base frame side bar 12 and a generally vertical, rearwardly inclined tubular member 44 secured to the member 43 and into which the carrier side bar 40 fits, as shown particularly in FIG. 4. The tubular member 43 is provided with a longitudinal slot 43A which allows the fixture 42 to be longitudinally adjusted past the fitting 35. A locking means is provided for selectively locking the fixture 42 in any one of a plurality of desired longitudinal positions. This may be any device such as a pin 45 selectively positioned into a hole 46 provided in the member 43 and any one of a plurality of holes 47 provided in the base frame side bar 12.

A generally U-shaped handle bar 50 is pivotally secured as at 51 within slots 52 in the upright side bars 40. A loop element 53 connected to each side bar 40 is provided to engage a finger element 54 on each leg of the handle bar 50 to hold the handle bar 50 in a raised position. The bar 50 may thus be released and pivoted downward as desired.

Figure 12:
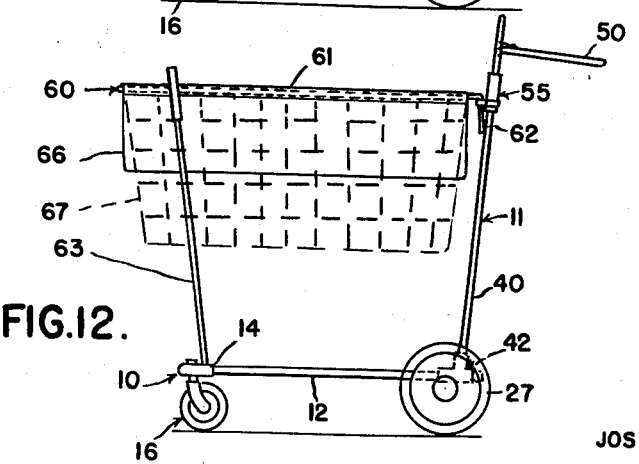
FIG. 12 is a side elevational view illustrating the utility cart as applied with other accessories.

An accessory fixture 55 is slidably secured to each side bar 40 and comprises a tubular member 56 having a socket fitting 57 secured thereto. Various accessories may be adapted to be connected to the side bars 40 by means of the socket fittings 57. One such accessory, as shown in FIGS. 1, 5 and 12 comprises a frame support 60 having a generally U-shaped tubular member 61 provided with down-turned extensions 62 which may be removably connected to the socket fittings 57 as shown in FIG. 4. A pair of legs 63 are pivoted as at 64 to the member 61 and are adapted to fit into a slightly enlarged socket 65 provided in the corner fixtures 14, as shown in FIG. 5. If desired, a plurality of receptacles similar to sockets 65 may be provided permitting a limited amount of adjustability of the angular relationship between the frame support 60 and the upright side bars 11 for a given longitudinal position of the side bars 11 with respect to the base frame structure 10. Also by providing several sockets 65 the legs 63 may be used over a wide range of vertical and longitudinal adjustments. Any of a variety of component accessories, such as baby carriage basket 66 or a shopping basket 67 as shown in FIG. 12 may be adapted to be carried by the frame support 60.

Instead of the legs 63, support arms 68 removably secured to the member 61 and to the side bars 40 by pins 68a and 68b as shown in FIG. 13 may be utilized, as when the utility cart is used as a rollaway bedside table, the frame support 60 going above and the base frame structure 10 going below the bed. A plurality of longitudinally spaced sockets may be provided in the side bars 40 to permit a wide range of longitudinal adjustment of the member 61 with respect to the carrier structure 11.

Figure 11:
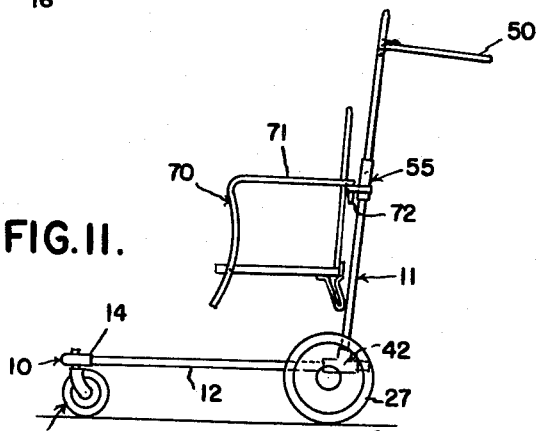
FIG. 11 is a side elevational view illustrating another position of the utility cart of FIG. 10.

Other accessories, such as a high chair or stroller seat 70, as shown in FIGS. 2, 10 and 11 may have some other frame support 71 provided with downturned extensions 72 similar to the extensions 62 of the frame support 60.

It will be noted that additional supports or braces may be provided as needed on the base frame structure 10 and the upright carrier 11, such as a lower carrier bar 73 and a transverse brace 74 secured between the fixtures 42, as shown in FIGS. 1 and 2.

The accessory frame supports 60 and 71 connected to the fixtures 55 may be vertically adjusted and locked on the upright carrier side bars 40 by any means such as a pin 75 extending through aligned holes in the fixture members 56 and the side bars 40. The frame supports 60 and 71 are also preferably positively locked into the socket fitting 57 by any means such as is shown in FIG. 4, in which a fitting 80, rotatably carried on the member 40 is provided with a flange element 81 which extends over the extension 62 when in the position shown. A retainer ring 82 is secured to the tubular member 56 above the fitting 80 and is provided with a depressed U-portion 83 which engages in a slot in the fitting 80. A spring 84 holds the fitting 80 in position against the retainer ring 82. To release the frame supports, the fitting 80 is pressed downwardly against the spring 84 and rotated so that the flange 81 provides space for removal of the extension 62 from the socket fitting 57.

FIGS. 10 and 11 illustrate the utility of the longitudinal adjustment of the upright carrier 11 on the base frame structure 10 in combination with the vertical adjustment of the frame support 71 on the carrier 11. In FIG. 10, the raised chair 70 serves as a high chair, and to maintain stability, a forward longitudinal adjustment is used. When the chair 70 is lowered as in FIG. 11 to serve as a stroller, a rearward longitudinal adjustment is used.

Further, the pivotal connection of the legs 63 and the frame support 60 permits the legs 63 to be pivoted to substantially the plane containing the frame support 60 for purposes of storage. Also the pivotal connection in combination with the slightly enlarged socket 65 permits the legs 63 to be used over a wide range of longitudinal adjustment of the upright carrier 11. If a wider range of longitudinal and vertical adjustment is desirable the support arms 68 may be used instead of the legs 63.

Although I have described and illustrated only a few preferred embodiments of my invention, it will be apparent to one skilled in the art to which the invention pertains that various changes and improvements may be made therein without departing from the spirit of the invention or the scope of the appended claims.

I claim:

1. A wheeled utility cart comprising
   (a) a base frame structure having spaced longitudinally extending side members,
   (b) traction wheels supported by said frame structure,
   (c) an upright carrier structure longitudinally adjustably secured to said side members and comprising a pair of spaced connected bars extending generally vertically and inclined slightly to the rear,
   (d) an accessory structure and means vertically adjustably securing said accessory structure to said upright carrier structure,
   (e) a handle bar pivotally carried by said upright carrier structure adjacent the upper extremity thereof,
   (f) said accessory structure comprising a support frame detachably secured to said securing means and extending in a plane substantially parallel to a plane containing said base frame structure,
   (g) said support frame structure being substantially rectangular in plan and being adapted to selectively carry a tray, table top, basket and carriage body, and
   (h) said carrier structure arranged to be disposed in a forwardly adjusted position when carrying said accessory structure disposed in an upper adjusted position and to be disposed in a rearwardly adjusted position when carrying said accessory structure disposed in a lower adjusted position whereby to maintain the assembly in balance.

2. The cart as defined in claim 1 and including means supporting said support frame, said supporting means comprising
   (a) a pair of legs pivotally carried on said support frame, and
   (b) sockets being provided in said base frame structure in alignment with said legs.

3. The cart as defined in claim 1 and including means supporting said support frame, said supporting means comprising,
   (a) a plurality of longitudinally spaced sockets provided in said upright carrier structure,
   (b) a pair of support arms removably pivotally secured to said support structure and adapted to be removably secured in a pair of said sockets whereby said support arms may be used to provide support to said support structure over a wide range of longitudinal adjustment of said support structure on said carrier structure.

4. A wheeled utility cart of the character described, comprising a base frame structure consisting of spaced longitudinally extending tubular side bars and a transverse bar connecting the forward ends of said side bars, corner fixtures for each of said forward corners, means on each fixture for supporting a trailing traction wheel, each fixture having a socket, an upright carrier structure longitudinally adjustably supported on said base frame structure and comprising a pair of rearwardly inclined generally vertical tubular side bars, said upright carrier structure having a fixed angular relation to said base frame structure in all adjusted positions, and a cross bar connecting the upper ends of said side bars of said upright carrier structure, means adjustably secured to the vertical side bars of said upright carrier structure and provided with a socket and locking means, a frame support having downturned extensions adapted to be fitted into the socket of said last named fixture, and legs pivoted on said frame support and adapted to be moved into alignment and seated in the socket of said first mentioned fixture whereby said frame support will be supported by said legs over a range of positions of said frame support on said side bars and of said upright carrier structure on said base structure, said frame support adapted to the selective support of a tray, table top, basket and carriage body, said side bars of said base frame structure carrying a rear axle and traction wheel assembly and said upright carrier structure arranged to be disposed in a forwardly adjusted position with respect to said base structure when carrying said frame support disposed in an upper adjusted position and to be disposed in a rearwardly adjusted position when carrying said frame support disposed in a lower adjusted position whereby to maintain the assembly in balance.

5. A wheeled utility cart of the character described, comprising a base frame structure consisting of spaced longitudinally extending tubular side bars and a transverse bar connecting the forward ends of said side bars, corner fixtures for each of said forward corners, means on each fixture for supporting a trailing traction wheel, each fixture having a socket, an upright carrier structure supported on said base frame structure and comprising a pair of rearwardly inclined generally vertical tubular side bars and a cross bar connecting the upper ends of said side bars of said upright carrier structure, means longitudinally adjustably securing the lower ends of the side bars of said upright carrier structure to the side bars of said base frame structure, said upright carrier having a fixed angular relation to said side bars of said base frame structure in all adjusted positions, a fixture longitudinally adjustably secured to the vertical side bars and provided with a socket and locking means, a frame support having downturned extensions adapted to be fitted into the socket of said last named fixture, and legs pivotally carried on said frame support and adapted to be moved into alignment and seated in the sockets of said first mentioned fixtures whereby said frame support will be supported by said legs over a range of positions of said frame support on said side bars and of said upright carrier structure on said base structure, said side bars of said base frame structure carrying a rear axle and wheel assembly and said upright carrier structure arranged to be disposed in a forwardly adjusted position with respect to said base structure when carrying said frame support disposed in an upper adjusted position and to be disposed in a rearwardly adjusted position when carrying said frame support disposed in a lower adjusted position whereby to maintain the assembly in balance.

6. A wheeled utility cart of the character described, comprising a base frame structure consisting of spaced longitudinally extending tubular side bars and a transverse bar connecting the forward ends of said side bars, corner fixtures for each of said forward corners, means on each fixture for supporting a trailing traction wheel, each fixture having a socket, an upright carrier structure supported on said base frame structure and comprising a pair of rearwardly inclined generally vertical tubular side bars and a cross bar connecting the upper ends of said side bars, means longitudinally adjustably securing the lower ends of the side bars of said upright carrier structure to the side bars of said base frame structure, said upright carrier having a fixed angular relation to said side bars of said base frame structure in all adjusted positions, a fixture longitudinally adjustably secured to the vertical side bars of said upright carrier structure and provided with a socket and locking means, a frame support having downturned extensions adapted to be fitted into the socket of said last named fixture, and legs pivotally carried on said frame support and selectively adjusted to be secured to the base frame structure and to said side bars thereof whereby said frame support will be supported by said legs over a range of positions of said frame support on said side bars and of said upright carrier structure on said base structure, said side bars of said base frame structure carrying a rear axle and wheel assembly, said base frame structure carrying a grid-like platform, said frame support adapted to be located upwards of said grid-like platform and suitably spaced therefrom to provide clearance with respect to the elements supported thereby whereby to utilize said platform for carrying miscellaneous articles and said upright carrier structure arranged to be disposed in a forwardly adjusted position with respect to said base structure when carrying said frame support disposed in an upper adjusted position and to be disposed in a rearwardly adjusted position when carrying said frame support disposed in a lower adjusted position whereby to maintain the assembly in balance.

7. A wheeled utility cart of the character described comprising a U-shaped platform frame structure having tubular side bars extending rearwardly, a wheel and axle assembly carried by the rear end portions of the side bars of said platform frame structure, a platform grid-like floor structure carried by said platform frame, fixtures secured to the platform frame structure at each forward corner thereof and each fixture provided with a pair of sockets, trailing traction wheels supported in one of said sockets of each fixture, an upright carrier comprising rearwardly inclined generally vertical tubular bars connected at the top by a cross bar, a T-shaped fixture supporting each of said vertical tubular side bars and slidably adjustably secured to the side bars of said platform frame whereby to selectively position said upright carrier forwardly or rearwardly on said platform, said upright carrier having a fixed angular relation to said side bar of said platform frame structures in all adjusted positions, and fixtures longitudinally adjustably slidably secured to the vertical side bars of said upright carrier and each having a socket, and a utility frame supporting structure comprising a U-shaped frame of tubular bars provided with downturned ends arranged to seat in the sockets in the fixtures carried by said upright carrier vertical side bars, said utility frame provided with tubular legs hinged thereto and adapted to be moved into alignment and seated in the other of said sockets of said first mentioned fixtures whereby said frame support will be supported by said legs over a range of positions of said frame support on said side bars and of said upright carrier structure on said base structure, and means for locking said first mentioned fixtures to said side bars of said platfrom frame structure, said fixture on the upright carrier provided with means locking said utility frame thereto and said upright carrier structure arranged to be disposed in a forwardly adjusted position with respect to said base structure when carrying said frame support disposed in an upper adjusted position and to be disposed in a rearwardly adjusted position when carrying said frame support disposed in a lower adjusted position whereby to maintain the assembly in balance.

References Cited by the Examiner

UNITED STATES PATENTS

| | | | |
|---|---|---|---|
| 2,004,470 | 6/35 | Michal | 280—47.38 |
| 2,212,053 | 8/40 | Smith | 280—36 |
| 2,435,733 | 2/48 | Belyen | 280—47.38 X |
| 2,624,395 | 1/53 | Johnson | 280—47.41 |
| 2,667,985 | 2/54 | Woughter | 214—670 |
| 2,754,889 | 7/56 | Lovelace | 280—31 |
| 2,902,286 | 9/59 | Wood | 280—31 |

FOREIGN PATENTS 1,084,855   7/54   France.

A. HARRY LEVY, *Primary Examiner.*